Figure 1:
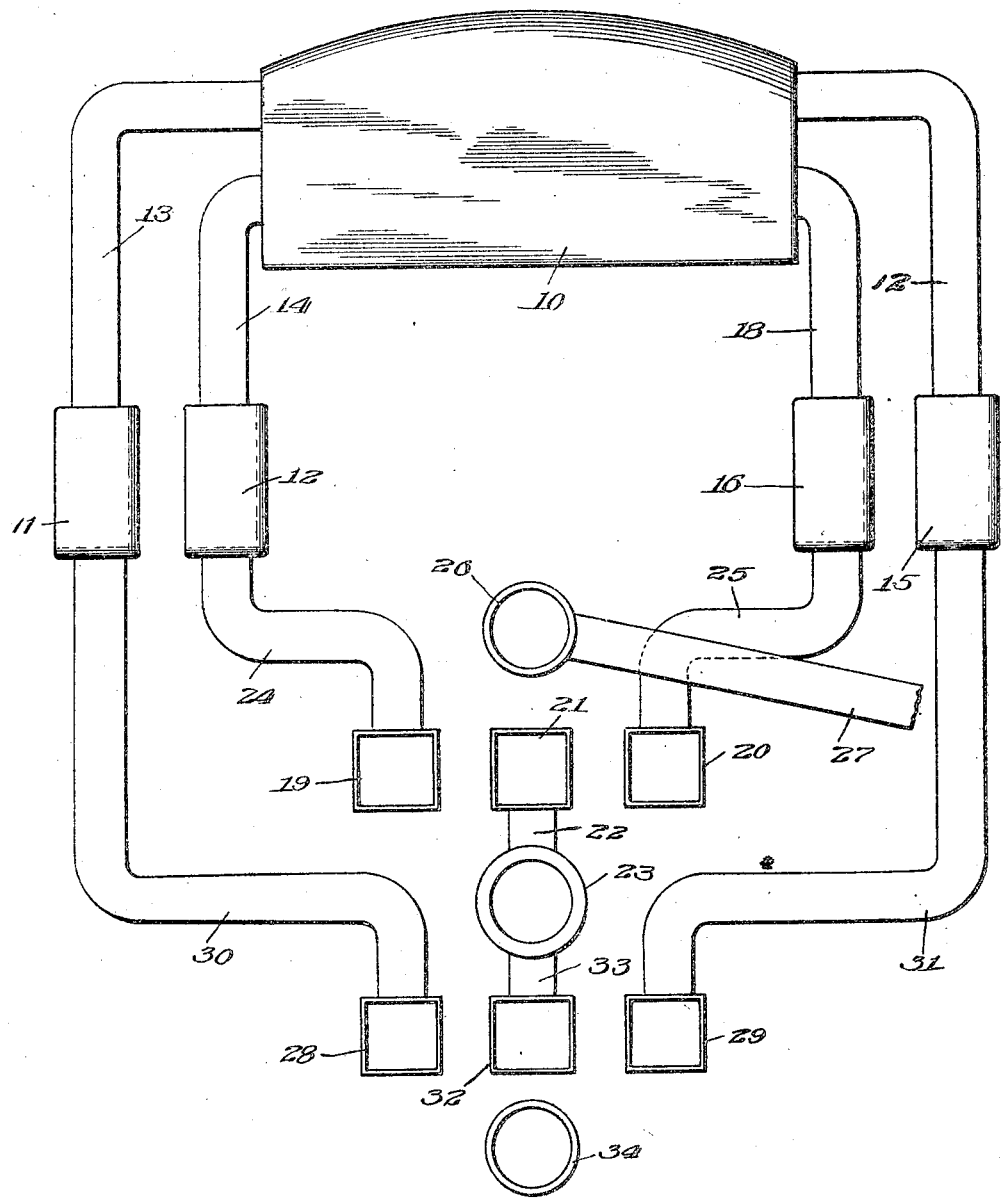

No. 812,840.  
PATENTED FEB. 20, 1906.  
W. A. FIELD, E. B. CLARK, 2D & F. WILSON.  
REVERSING VALVE.  
APPLICATION FILED JUNE 10, 1904.  
5 SHEETS—SHEET 2.

Witnesses:
Robert H. Weir
G. V. Domarus

Inventors
William A. Field,
Eugene B. Clark, 2nd,
Fred Wilson,
by Bond Adams Pickard & Jackson
their attys No. 812,840. PATENTED FEB. 20, 1906.
W. A. FIELD, E. B. CLARK, 2D & F. WILSON.
REVERSING VALVE.
APPLICATION FILED JUNE 10, 1904.
5 SHEETS—SHEET 3.
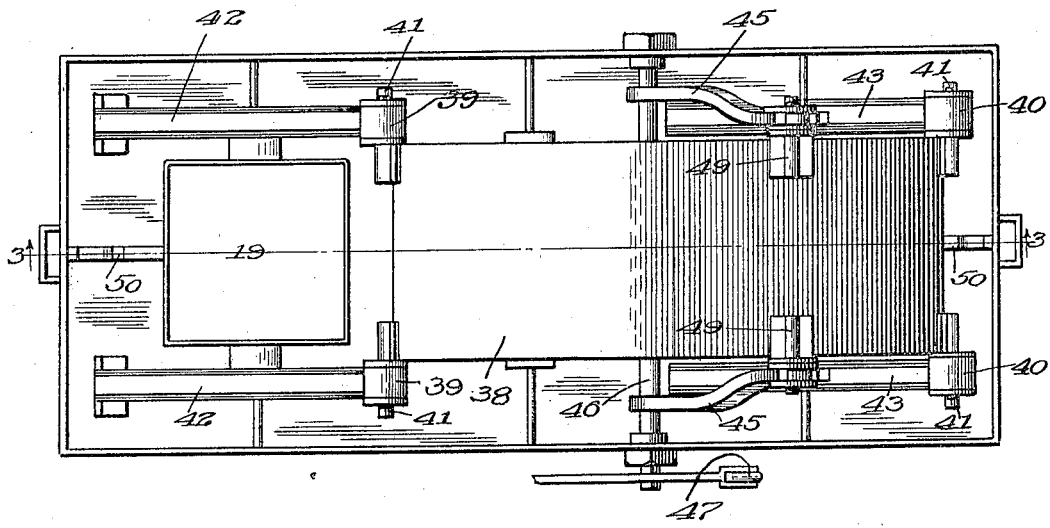
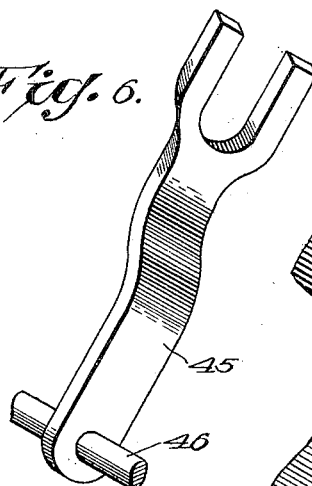
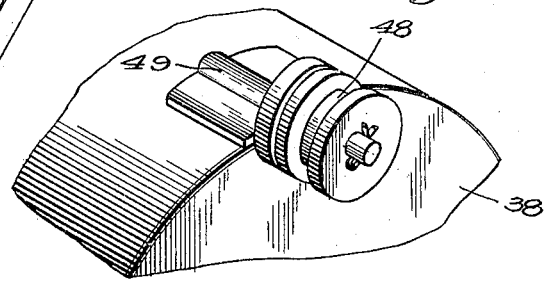
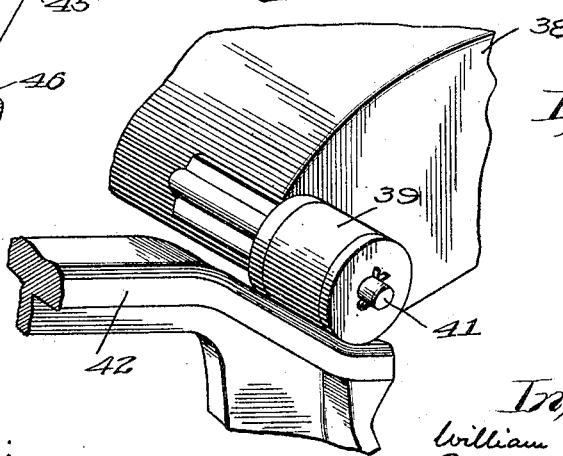
Witnesses:
Robert H. Weir
G. V. Domarus
Inventors:
William A. Field,
Eugene B. Clark, 2nd
Fred Wilson,
by Bond, Adams, Pickard & Jackson
their Attys.

No. 812,840. PATENTED FEB. 20, 1906.
W. A. FIELD, E. B. CLARK, 2D & F. WILSON.
REVERSING VALVE.
APPLICATION FILED JUNE 10, 1904.

5 SHEETS—SHEET 4.

Witnesses:
C. F. Domarus
Robert H. Weir

Inventors:
William A. Field,
Eugene B. Clark, 2nd
Fred Wilson
by Bond Adams Pickard Jackson
their Attys No. 812,840. PATENTED FEB. 20, 1906.
W. A. FIELD, E. B. CLARK, 2D & F. WILSON.
REVERSING VALVE.
APPLICATION FILED JUNE 10, 1904.

5 SHEETS—SHEET 5.

Witnesses:

Inventors
William A. Field,
Eugene B. Clark, 2nd,
Fred Wilson,
by Bond, Adams, Pickard & Jackson
their Attys.

UNITED STATES PATENT OFFICE.

WILLIAM A. FIELD, EUGENE B. CLARK, 2ND, AND FRED WILSON, OF CHICAGO, ILLINOIS, ASSIGNORS TO WELLMAN, SEAVER, MORGAN COMPANY, OF CLEVELAND, OHIO, A CORPORATION OF OHIO.

REVERSING-VALVE.

No. 812,840.      Specification of Letters Patent.      Patented Feb. 20, 1906.

Application filed June 10, 1904. Serial No. 211,958.

*To all whom it may concern:*

Be it known that we, WILLIAM A. FIELD, EUGENE B. CLARK, 2nd, and FRED WILSON, citizens of the United States, and residents of Chicago, in the county of Cook and State of Illinois, have invented certain new and useful Improvements in Reversing-Valves, of which the following is a specification, reference being had to the accompanying drawings.

Our invention relates to valves for controlling the supply of gas to furnaces, soaking-pits, &c. Such valves are designed to direct the gas in one direction or the other through the regenerators and the furnace and necessarily are subjected to high temperatures and to serious strains in other respects, so much so that so far as we are aware prior to our invention no wholly satisfactory valve for the purpose has been produced. It may be well to explain that in practice two ports communicating with different regenerators are placed at opposite sides of and equally distant from a port which communicates with the stack, so that when the valve-bonnet is in one position it connects one of said regenerator-ports with the stack and when in the other position it connects the opposite regenerator-port with the stack. When either of said ports is connected with the stack, air or gas, as the case may be, passes through the other port to the regenerator, thence to the furnace, and back through the regenerator and valve to the stack. The result is that by changing the position of the bonnet the gas or air can be caused to flow in either direction through the regenerators and furnace.

The objects of our invention are to provide a new and improved valve and mechanism for operating the same by which the proper seating of the bonnet may be effected with certainty, thereby avoiding damage to the valve by reason of the escape of gases from and their combustion outside of the bonnet, by which the valve may be quickly and easily shifted from either of its positions to the other, and to provide improved mechanism for shifting the bonnet, so that it may be caused to move slowly at the beginning and the end of its stroke and quickly during the intermediate portion thereof, thus not only economizing time in effecting the shifting of the bonnet, but also avoiding danger of injury by the jar ensuing from sudden seating of the bonnet at the end of its stroke. These objects we accomplish as illustrated in the drawings and as hereinafter described. What we regard as new is set forth in the claims.

Figure 2:
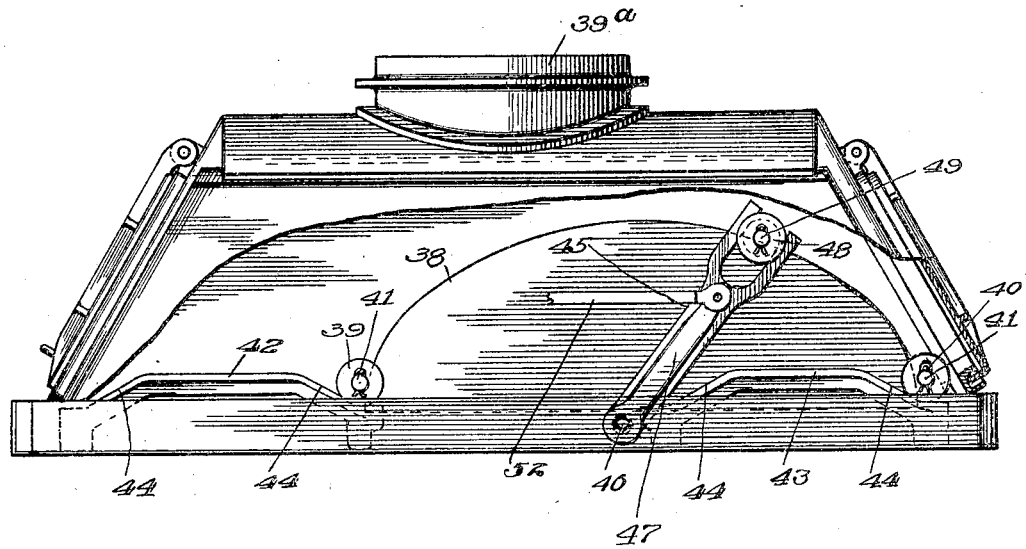
Figure 3:
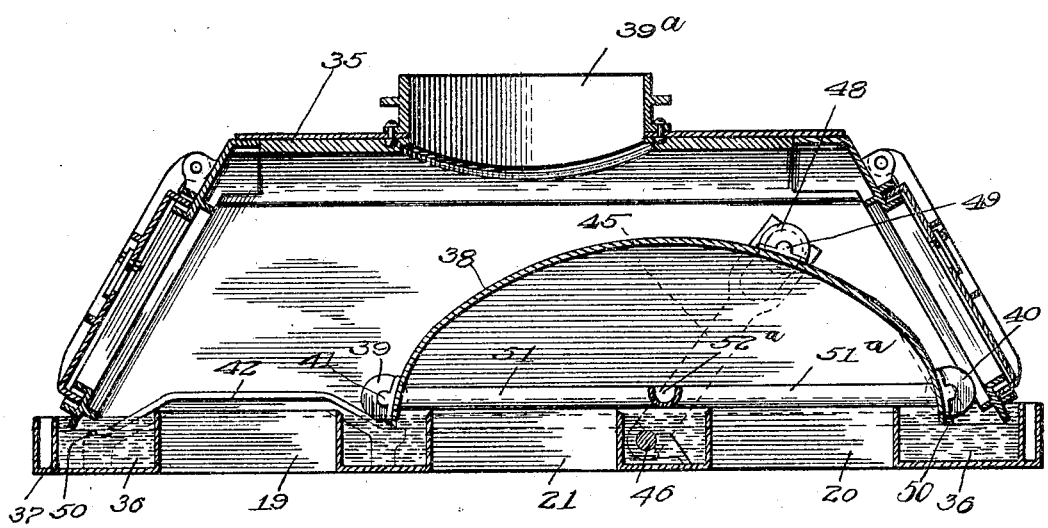
Figure 8:
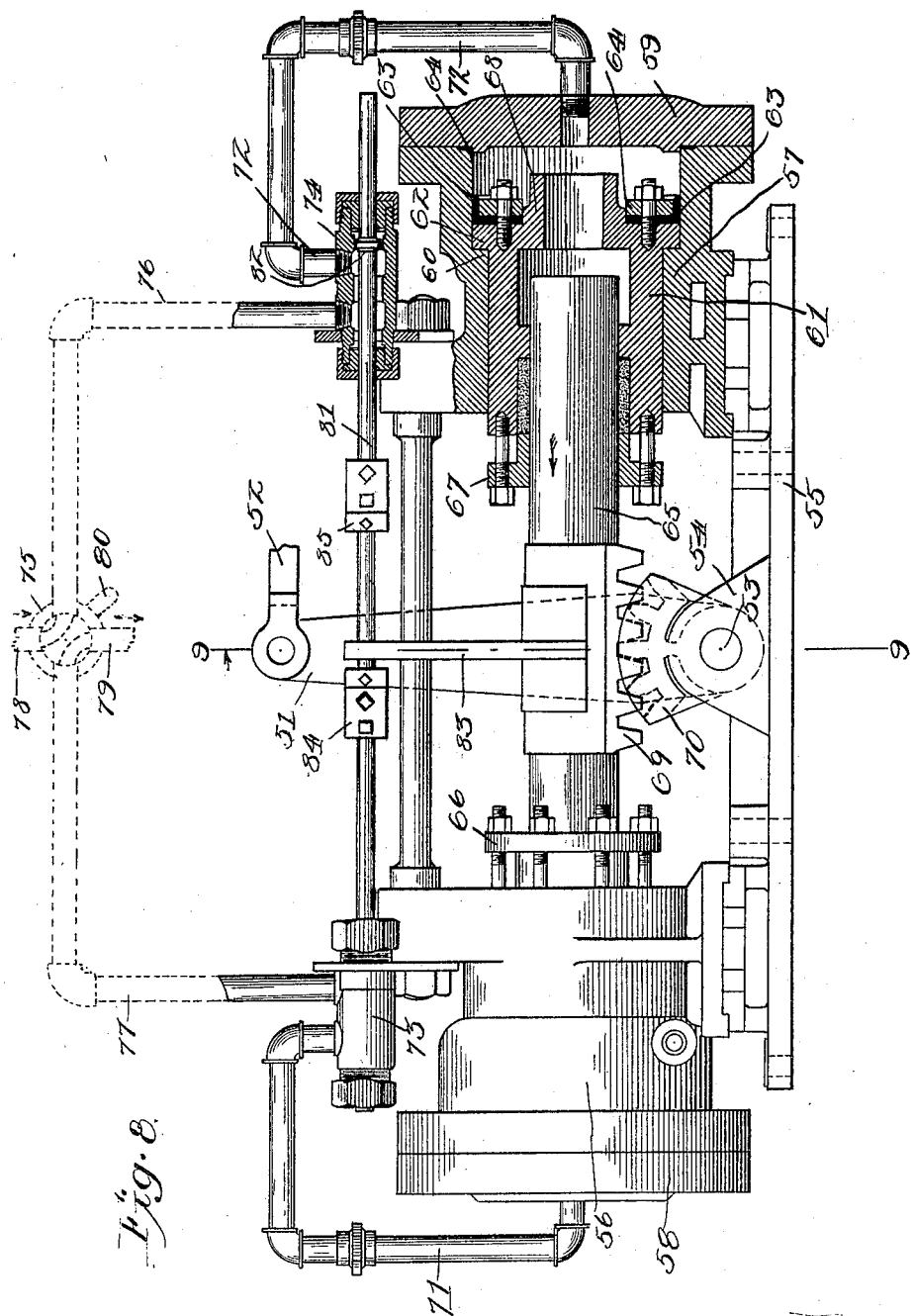
Figure 9:
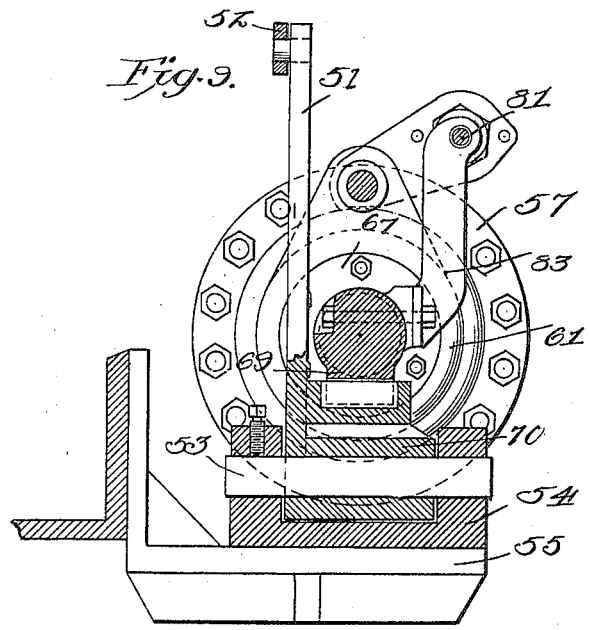
Figure 10:
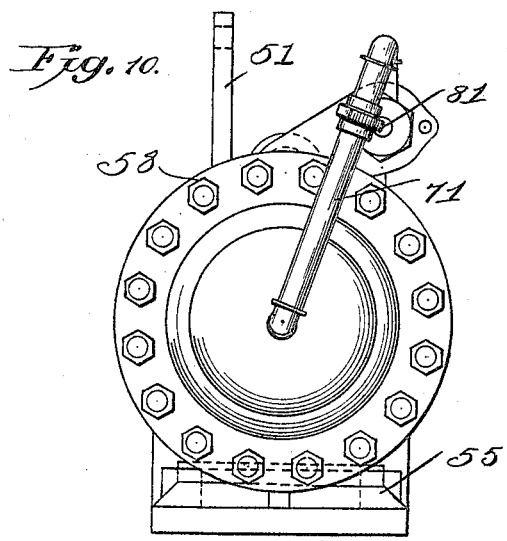

In the accompanying drawings, Figure 1 is a diagrammatic view illustrating the general arrangement of the furnace, the regenerators, the gas and air conduits and ports, &c. Fig. 2 is a side elevation of one of the valves, a part of the valve casing or hood being broken away. Fig. 3 is a longitudinal section on line 3 3 of Fig. 4. Fig. 4 is a plan view of the parts shown in Fig. 3. Fig. 5 is a perspective view illustrating part of the upper portion of the bonnet and one of the rollers through which engagement is made with the operating devices. Fig. 6 is a perspective view of one of the operating-arms by which the bonnet is moved from one position to the other. Fig. 7 is a perspective view of a part of one of the supporting-guides and one of the corners of the bonnet. Fig. 8 is an elevation, partly in section, of the operating mechanism for the bonnet. Fig. 9 is a partial vertical section on line 9 9 of Fig. 8, and Fig. 10 is a partial end view of the parts shown in Fig. 8.

Referring to the drawings, 10 indicates the furnace, which may be of any suitable construction.

11 12 indicate regenerators connected by conduits 13 14, respectively, with one end of the furnace, and 15 16 indicate corresponding regenerators connected by conduits 17 18, respectively, with the opposite end of the furnace 10.

19 20 indicate ports placed at opposite sides of a port 21, which communicates by a flue 22 with the stack 23. The port 19 is connected by a conduit 24 with the regenerator 12, and in like manner the port 20 is connected by a conduit 25 with the regenerator 16.

26 indicates a gas-inlet which opens into the valve casing or hood and through it communicates with one or the other of the ports 19 20, depending upon the position of the bonnet.

27 indicates a pipe through which gas is supplied to the gas-inlet 26.

28 29 indicate ports which communicate by conduits 30 31, respectively, with the regenerators 11 15. Said ports are placed at opposite sides of a port 32, which corresponds with the port 21, and is connected by a flue 33 with the stack 23.

34 indicates an air-inlet which communicates with either of the ports 28 29 through the valve casing or hood.

The arrangement above described, and illustrated in Fig. 1, is that which we prefer to use in connection with open-hearth furnaces; but it should not be understood that our invention is in any sense restricted to such arrangement or to use in connection only with open-hearth furnaces, since it may be employed wherever a reversing-valve of like character is required, the typical arrangement illustrated in Fig. 1 being shown and described merely for the purpose of making clear one of the situations in which our improved valve is designed to be used.

Referring again to the arrangement shown in Fig. 1, it will be understood that in practice the ports 19, 21, and 20 are all permanently inclosed by the valve casing or hood and that the gas-inlet also opens into said casing. Within the valve-casing is provided a bonnet adapted to connect one or the other of the ports 19 20 with the port 21, which communicates with the stack, so that gas entering the valve-casing from the gas-inlet 26 can enter only that port 19 or 20 which is uncovered, the other being the communication with the stack. With this arrangement gas entering the valve-casing through the gas-inlet 26 may pass through the uncovered port—as, for example, port 19—thence through conduit 24 to regenerator 12, thence through conduit 14 to the furnace 10, returning through conduit 18, regenerator 16, and conduit 25 to port 20, thence through the bonnet to outlet-port 21, through which it passes to the stack 23. When the bonnet is moved to the opposite position, the flow of gas moves in the opposite direction. In like manner the same operation takes place as regards the air introduced through air-inlet 34, the ports 28, 32, and 29 being in like manner uncovered by a valve-casing in which is a bonnet for directing the flow of air in either direction.

Our invention has to do with the construction and arrangement of the bonnet within the valve-casing and the devices for shifting it from one position to the other and is fully illustrated in Figs. 2 to 10.

As shown in Figs. 2 and 3, 35 indicates the valve casing or hood, which may be of any approved construction and is provided around its edges with a water seal 36.

As shown in Figs. 3 and 4, the water seal is best formed by providing an upwardly-extending flange 37, which incloses the ports, as 19, 21, and 20, so that the space within said flange may fill with water, thereby surrounding said ports, so that the edges of the bonnet, as well as the edges of the valve-casing, may be immersed.

38 indicates the bonnet, which, as shown in Fig. 3, is adapted to overlie two adjacent ports, thereby connecting them and at the same time separating them from the third port.

39ª indicates the gas or air inlet.

As best shown in Fig. 4, the bonnet 38 is provided with two pairs of rollers 39 40, the rollers 39 being at one end and the rollers 40 at the other end thereof. Said rollers are preferably mounted on studs 41, projecting from the four corners of the bonnet, so that the different rollers are carried slightly beyond the edges of the bonnet. The rollers 39 are adapted to run on guides 42 at one end of the valve, while the rollers 40 are adapted to run on guides 43 at the opposite end of the valve. The shape of said guides is best shown in Figs. 2 and 3, from which it will be seen that their intermediate portion is substantially horizontal, their end portions being downwardly inclined, as shown at 44 in Fig. 2. The guides 42 43 are so arranged that when the bonnet-rollers rest upon their lowermost portions the bonnet is in its operative position, while when said rollers rest on the horizontal portions of said guides the lower edges of the bonnet are elevated high enough to clear the upper edges of the ports over which it moves. Furthermore, the length of the guides is such that they suffice to carry the bonnet over from one of its positions to the other. By this construction endwise movement of the bonnet causes it to rise upon the guides 42 43 sufficiently to clear the upper edges of the ports, the bonnet being carried upon said guides automatically and directed by them from one position to the other. The inclined portions of the guides serve to facilitate the elevation of the bonnet, while by providing the intermediate horizontal portions the weight of the bonnet wholly rests upon the guides during the greater part of its movement, thus facilitating the operation of reversing.

For moving the bonnet longitudinally we provide forked arms 45 at opposite sides thereof, said arms being mounted upon a rock-shaft 46, mounted in suitable bearings. The shaft 46 is rocked in either direction by means of a lever 47, which is operated by hydraulic mechanism, as hereinafter described. The forks of the arms 45 engage grooved rollers 48, which are mounted on studs 49, projecting from the upper portions of the bonnet, at opposite sides thereof, as shown in Figs. 2, 4, and 5, thereby avoiding friction.

It should be understood that the arms 45 act merely to throw the bonnet from one position to the other, but at no time support its weight further than is incident to moving the bonnet up the inclined portions of the guides 42 43.

50 indicates stops at the opposite ends of the valve for limiting the movement of the bonnet, said stops being placed so as to intercept the ends of the bonnet when it reaches its different operative positions. While we prefer this arrangement, the stops may be otherwise placed—as, for instance, at the ends of the guides.

It will be noted that, as best shown in Fig. 2, the guides 42 43 extend high enough above the side edges of the bonnet 38 so that it is practically impossible for the bonnet to get out of place laterally. Preferably the bonnet is provided with longitudinal and transverse braces 51ª 52ª, respectively, as shown Fig. 3.

By the construction described we avoid the objections incident to the older constructions and make it practicable to make the valve-bonnet of cast-iron, which is not liable to warp under the temperatures to which it is subjected during the normal operation of the valve. Moreover, as the operation of the bonnet is so controlled that it cannot become displaced and is sure to seat accurately over the ports each time it is thrown, there is no danger of combustion in the valve-casing, and consequently the bonnet is not subjected to extraordinary temperatures.

For shifting the bonnet from either position to the other we employ the mechanism illustrated in Figs. 8, 9, and 10, which is constructed to apply greater power to the shifting of the bonnet at the beginning of its stroke, the power being reduced and the speed increased when the bonnet reaches the level portion of the guides 42 43, the power being further reduced and the speed checked when the bonnet approaches the end of its stroke. The construction by which these results are secured is best shown in Fig. 8. As therein shown, 51 indicates an operating-lever by which the lever 47 is rocked in either direction to control the movement of the bonnet, the lever 51 being connected to the lever 47 by means of a connecting-bar 52. (Best shown in Figs. 2 and 8.) The lever 51 is mounted upon a rock-shaft 53, suitably supported in bearings 54, mounted on a bed-plate 55, which also carries at or near its ends hydraulic cylinders 56 57, respectively.

58 59 indicate, respectively, the heads of the cylinders 56 57. As best shown at the right in Fig. 8, the outer portion of the cylinder 57 is greater in diameter than the inner portion thereof, an annular shoulder 60 being formed therein. The cylinder 56 is of similar construction.

61 indicates a tubular piston mounted in the cylinder 57 and movable longitudinally therein. As shown, the main body of the piston 61 fits closely in the reduced portion of the cylinder 57, while at its inner end said piston is provided with an annular flange or collar 62, which fits the larger portion of the cylinder 57, which flange 62 is best formed integral with the piston 61.

63 indicates packing carried on the inner face of the piston 61, said packing being held in place by a packing-ring 64, as shown at the right in Fig. 8. The piston 61 is reduced in diameter at its inner end, as shown at 68 in Fig. 8. A similar piston is provided in the cylinder 56.

65 indicates a plunger the ends of which fit in the pistons of the cylinders 56 57, respectively, and have bearings therein, so that the plunger may be moved independently of said pistons.

66 67 indicate glands for preventing leakage around the plunger. The plunger 65 is provided intermediately with a rack 69, which meshes with a segmental rack 70, securely connected with the lever 51 and preferably formed integral therewith, as shown in Fig. 9. By this construction when the plunger 65 is reciprocated the lever 51 is rocked in one direction or the other, thereby rocking the lever 47 and shifting the position of the bonnet.

71 72 indicate pipes which communicate, respectively, with the outer ends of the cylinders 56 57, being secured in the heads 58 59 thereof, as shown in Fig. 8. The pipe 71 communicates with a cut-off cylinder 73, which is adjacent to the cylinder 56, and, similarly, the pipe 72 communicates with a cut-off cylinder 74, arranged adjacent to the cylinder 57.

75 indicates a controlling-valve which communicates by a pipe 76 with the cut-off cylinder 74. The valve 75 also communicates by a pipe 77 with the cut-off cylinder 73.

78 79 indicate, respectively, supply and exhaust pipes which also communicate with the valve 75, which is so constructed that water may be supplied to either cut-off cylinder and exhausted from the other by operating the valve 75.

80 indicates a hand-lever for adjusting the position of the valve 75.

81 indicates a piston-rod the ends of which project into and preferably through the cut-off cylinders 73 74. Said piston-rod carries two cut-off pistons 82, one in each cut-off cylinder. The arrangement is such that by moving said piston-rod 81 longitudinally the cut-off pistons carried thereby may be moved in their respective cylinders so as to bring the pipes which communicate therewith into communication with each other or to cut off communication between them almost altogether. Communication is not altogether cut off for the reason that the pistons 82 are made slightly less in diameter than the internal diameter of the cylinder 74, thereby permitting leakage around said piston when the piston stands between the openings of the pipes. When the piston 82 is at either end of the cylinder 74, free communication is permitted between said pipes 72 and 76. The same is true in the case of the cylinder 73.

The piston-rod 81 is moved longitudinally to control the position of the pistons 82 by movement of the plunger 65, which is communicated to said piston-rod by means of a bar 83, which is carried by the plunger 65 and embraces the rod 81, as shown in Fig. 9, said bar being adapted to engage one or the other of collars 84 85, mounted on and secured to the piston-rod 81 at opposite sides of the bar 83, as shown in Fig. 8. The adjustment of the various parts is such that when the plunger 65 approaches either end of its stroke the bar 83 strikes the collar 84 or 85 toward which it may be moving, thereby moving the piston-rod 81 in the same direction and carrying the pistons 82 in the cylinders 73 74 into position between the pipes which communicate with their respective cylinders.

In the arrangement shown in Fig. 8 the plunger 65 is shown as moving in the direction indicated by the arrow thereon, being at the center of its stroke. At such time the fluid enters through valve 75 from inlet-pipe 78, passing through pipe 76 to cylinder 74, through said cylinder to pipe 72, from which it enters cylinder 57. At this time cylinder 56 is in communication with the exhaust-pipe 79 through pipe 71, cut-off cylinder 73, pipe 77, and valve 75, and the cut-off piston 82 of cylinder 73 is at the right-hand end of said cylinder, so that free passage of the exhaust fluid is permitted. At the commencement of this operation the tubular piston 61 was at the right-hand end of the cylinder 57 and the plunger 65 was also at the right-hand limit of its stroke, its right-hand end then abutting against the reduced portion 68 of the piston 61.

Upon the first admission of fluid to the cylinder 57 the diameter of the operating-surface would be equal to the greater diameter of the cylinder 57, so that a relatively slow movement would ensue, but the power developed would be correspondingly greater. The plunger 65 and piston 61 would thereby be moved together to the left until the flange 62 was stopped by the shoulder 60. Thereafter the entire power would then be applied to the plunger 65 alone, which would accordingly move more rapidly, the effect of the stoppage of the piston 61 being to reduce the diameter of the operating-surface of the piston.

It should be explained, further, that when the valve 75 was operated to admit fluid to cut-off cylinder 74 the piston 82 therein would lie between the openings of pipes 76 and 72, being left in such position at the end of the preceding stroke, as will be hereinafter explained. Upon the admission of fluid to the cut-off cylinder 74 from the inlet-pipe, however, such fluid would operate to force the piston 82 to the right-hand end of the cut-off cylinder 74, the piston 81 moving with it, thereby carrying the collars 84 85 to the right into the position shown in Fig. 8. Upon movement of the plunger 65 to the left, under the influence of the fluid admitted to the cylinder 57, it would, when near the limit of its movement in that direction, engage the collar 84 and carry it along with it to the left, thereby moving the piston-rod 81 in the same direction and carrying the cut-off pistons 82 into position between the openings of the pipes which communicate with their respective cylinders 73 74. The parts are so adjusted that at the completion of the stroke of the plunger 65 the cut-off pistons 82 remain in this position. The result of this last movement is that fluid under pressure is admitted to the operating-cylinder and exhaust fluid is allowed to escape from the opposite cylinder only very slowly, since the movement is controlled solely by the leakage of the fluid around the cut-off pistons 82. Consequently the plunger 65 moves very slowly toward the end of its stroke, and accordingly the bonnet is allowed to descend gently to its operative position free from shock or jar. Obviously the slow-down movement described can be regulated by varying the size of the cut-off pistons or the bore of the cut-off cylinders. By the construction described, therefore, we provide for applying greater power in lifting the bonnet from its operative position, where greater power is required, and effect such lifting movement at a slow speed, so that danger of breakage from sudden starting is avoided. We further provide accelerated speed with reduced power for moving the bonnet over the level portions of the guides, where very little power is necessary and greater speed is desirable, and, finally, we provide for reducing the speed without increasing the power at the conclusion of the movement of the bonnet, where no power is required and retardation is desirable.

While we have described in detail the specific embodiment of our invention illustrated in the accompanying drawings, it should be understood that our invention is not restricted to such details of construction except in so far as they are particularly claimed, but includes, generically, the subject-matter of the broader claims.

That which we claim as our invention, and desire to secure by Letters Patent, is—

1. A reversing-valve, comprising a valve-casing, a reversing-bonnet, mechanism for moving said bonnet, mechanism for raising said bonnet from one position and carrying it over and depositing it in another position, and fluid-pressure mechanism for automatically applying greater power to said bonnet during the lifting movement thereof and less power during the descending movement thereof, substantially as described.

2. A reversing-valve, comprising a valve-casing, a reversing-bonnet, mechanism for moving said bonnet, mechanism for raising said bonnet from one position and carrying it over and depositing it in another position, and means for applying greater power to said bonnet during the lifting movement thereof and less power during the descending movement thereof and for automatically increasing the speed thereof during the intermediate portion of its movement, substantially as described.

3. A reversing-valve, comprising a valve-casing, a reversing-bonnet therein, fluid-pressure mechanism for operating said bonnet, said operating mechanism having fluid-pressure-actuated means for applying greater power initially to said bonnet and afterward reducing the power applied thereto, substantially as described.

4. A reversing-valve, comprising a valve-casing, a reversing-bonnet therein, mechanism for operating said bonnet, said operating mechanism having means for applying greater power initially to said bonnet and afterward reducing the power applied thereto, and means for automatically increasing the speed of said bonnet during the intermediate portion of its movement, substantially as described.

5. A reversing-valve, comprising a valve-casing, a reversing-bonnet therein, mechanism for operating said bonnet, said operating mechanism having means for applying greater power initially to said bonnet, means for automatically increasing the speed of said bonnet during the intermediate portion of its movement, and means for reducing the speed of said bonnet toward the end of its movement, substantially as described.

6. A reversing-valve, comprising a valve-casing, a reversing-bonnet therein, guides for said bonnet having their end portions downwardly inclined and their intermediate portions substantially horizontal, mechanism for operating said bonnet, said operating mechanism having means for applying greater power to the bonnet when moving up said inclined portions of said guides and for reducing the speed thereof when descending said inclines, and means for increasing the speed of said bonnet when moving over the horizontal portions of said guides, substantially as described.

WILLIAM A. FIELD.
EUGENE B. CLARK, 2ND.
FRED WILSON.

Witnesses:
R. H. BOWLLEY,
WM. T. DEAN.